United States Patent
Kowalewski et al.

(10) Patent No.: US 7,154,935 B1
(45) Date of Patent: Dec. 26, 2006

(54) METHOD FOR RECEIVING RADIO SIGNALS IN A MOBILE STATION AND A MOBILE STATION

(75) Inventors: Frank Kowalewski, Salzgitter (DE); Peter Mangold, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 1018 days.

(21) Appl. No.: 09/685,857

(22) Filed: Oct. 11, 2000

(30) Foreign Application Priority Data

Oct. 11, 1999 (DE) .................... 199 49 007

(51) Int. Cl.
*H04B 1/69* (2006.01)
*H04B 1/707* (2006.01)
*H04B 1/713* (2006.01)

(52) U.S. Cl. .................. 375/148; 375/130; 375/147; 375/296

(58) Field of Classification Search ............. 375/148, 375/208, 296; 370/335, 208
See application file for complete search history.

(56) References Cited

U.S. PATENT DOCUMENTS

| 4,866,395 A | | 9/1989 | Hostetter | |
| 5,666,352 A | * | 9/1997 | Ohgoshi et al. | 370/206 |
| 6,028,888 A | * | 2/2000 | Roux | 375/148 |
| 6,252,914 B1 | * | 6/2001 | Yamamoto | 375/296 |
| 6,356,555 B1 | * | 3/2002 | Rakib et al. | 370/441 |
| 6,570,933 B1 | * | 5/2003 | Makinen | 375/296 |
| 6,751,447 B1 | * | 6/2004 | Jin et al. | 455/114.3 |

FOREIGN PATENT DOCUMENTS

| DE | 195 39 963 | 2/1997 |
| EP | 0 757 464 | 2/1997 |

OTHER PUBLICATIONS

Esmailzadeh, R. and Nakagawa, M., *Pre-Rake Diversity Communication Systems*, IEICE Trans. Commun., vol. E76-B, No. 8, Aug. 1993, pp. 1008-1014.

* cited by examiner

Primary Examiner—Stephen Chin
Assistant Examiner—Harry Vartanian
(74) Attorney, Agent, or Firm—Kenyon & Kenyon

(57) ABSTRACT

A method for receiving radio signals in a mobile station, and a mobile station for sending and receiving radio signals are proposed. The method and the mobile station have the aim of correcting predistorted code-spread and phase-modulated radio signals with respect to a phase error. In this context, in the receiver of the mobile station, the phase is determined for the radio signals, in order to carry out a phase demodulation, and the phases are mapped in a preselected phase zone and averaged, in order to formulate therefrom a phase correction factor, by which the code-despread radio signals are multiplied in order to correct the phase error. The method according to the present invention therefore improves the data detection of the received radio signals.

4 Claims, 2 Drawing Sheets

METHOD FOR RECEIVING RADIO SIGNALS IN A MOBILE STATION AND A MOBILE STATION

FIELD OF THE INVENTION

The present invention relates to a method for receiving radio signals, and to a mobile station for transmitting and receiving radio signals.

BACKGROUND INFORMATION

The article "Pre-Rake Diversity Combination for Direct Sequence Spread Spectrum Mobile Communications Systems," R. Esmailzadeh and M. Nagakawa, IEICE Trans. Commun., Vol. E76-B, No. 8, August 1993, describes that in response to code spreading, a predistortion is possible through a pre-rake predistortion. This predistortion of the signals to be transmitted is advantageously carried out in a base station, for in a base station, which is connected to an electrical supply system, complex signal processing functions can be integrated more easily than in a mobile station, the service life of whose battery or storage cell is limited. This predistortion presupposes that the mobile station, along with the remaining radio signals, transmits training symbols to the base station in the so-called reverse link, so that the base station can evaluate the transmission properties of the radio channel between the base station and the mobile station. In the forward link, from the base station to the mobile station, no training symbols are then necessary because, from the channel evaluation, the base station infers the forward link from the reverse link. So-called channel reciprocity is assumed. This saves on transmission bandwidth through the use of this asymmetrical base station/ mobile station structure.

SUMMARY OF THE INVENTION

The method according to the present invention for receiving radio signals, and the mobile station according to the present invention, have the advantage that the predistortion is improved because no absolute channel reciprocity is provided, and this error, arising from this source, is advantageously corrected through a phase correction in order to achieve improved data detection results in the receiving mobile station.

Furthermore, it is advantageous that, using an average, the phase error of the radio signals received by the mobile station can be recognized and eliminated on the basis of the different transmitting technologies in the mobile station and the base station and on the basis of the dissimilar quality of the elements used. Using short averages, phase alterations due to a changing radio channel can be corrected.

It is particularly advantageous that the phase correction factor is calculated by scaling the average value, so that no phase modulation arises as a result of the phase correction factor and the phase is conjugated, i.e., the sign of the phase error is reversed so that the average phase error is eliminated.

In one advantageous refinement of the present invention, it is possible that, in addition to a phase modulation, a combination of a phase modulation and an amplitude modulation is possible, as is made possible, for example, by quadrature amplitude modulation (QAM). As a result, many more conditions can be created for the modulated signals.

DETAILED DESCRIPTION

Figure 1:
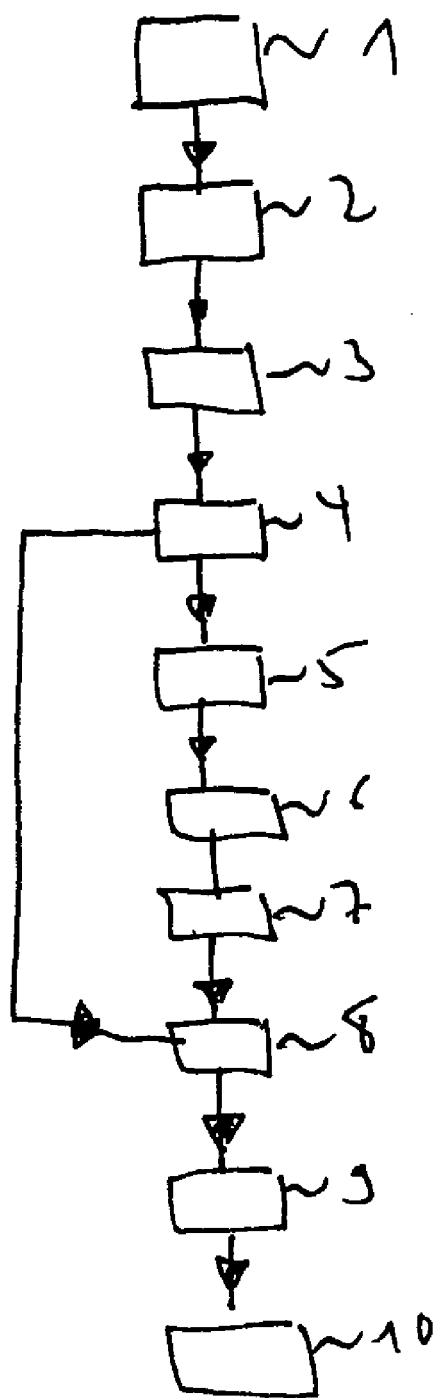
FIG. 1 depicts a method according to the present invention for receiving code-spread radio signals.

Mobile radio systems have base stations and mobile stations, a mobile station communicating directly only with the base station. The transmission from the base station to the mobile station is designated as a downlink or forward link, whereas the transmission link from the mobile station to the base station is designated as uplink or reverse link. Since the base station is usually positioned on a building or a mast, and this base station is connected to an electrical supply system and the base station is provided for the use of a larger area, it is possible to integrate in the base station improved functions using more energy than in a mobile station, which has only a limited power supply on the basis of a battery or a storage cell. It is therefore a goal to minimize the energy consumption of the mobile station. Furthermore, a base station is a product that is accordingly sold in far smaller quantities than a mobile station, which is a mass product. Therefore, the price pressure with regard to a mobile station is much greater, and as many functions as possible should be transferred from the mobile station to the base station in order to make the mobile station as inexpensive as possible.

Code spreading is a modulation technology which will dominate future mobile radio systems such as UMTS (Universal Mobile Telecommunication System). In code spreading, for each mobile station a specific code is used in order to encode the information to be transmitted and to decode the information received.

For a radio cell, in which are located a base station and a plurality of mobile stations, code spreading means that only one spectrum for the transmission of radio signals is used for all transmissions of radio signals. As a result, improved exploitation of the available frequency spectrum is possible. The codes for the individual mobile stations are constructed so that the transmitted signals that are spread using these codes do not interfere with each other, this behavior being designated as orthogonality. If the codes are also orthogonal at the receiver, a simple correlator, which is implemented on a signal processor, is sufficient for code spreading.

On the basis of the transmission properties of a radio channel, it is possible that the different codes during the transmission lose their orthogonality with respect to each other. A mobile station, which then despreads the signals designated for it, also despreads a small portion of the signals coded using the other codes, because the orthogonality has been lost. This portion is noticeable as noise and reduces the signal-to-noise ratio of the received signals and thus the reception quality.

In addition to the simple correlation, further methods were developed for code despreading. One method of this type is so-called joint-detection, in which all codes received by one mobile station are despread and then only the signals transmitted for this mobile station are used further, the other despread signals being discarded. This solution requires an increased outlay for hardware for the mobile station and therefore greater energy usage. In joint-detection, training symbols in the received radio signals are compared with stored training symbols in order to determine the transmission properties of the radio channels, to reestablish the orthogonality of the codes with respect to each other.

Through the use of so-called joint-predistortion in one transmitter of a base station, this method is used as a predistortion of the signals to be transmitted. For this purpose, the base station in the reverse channel evaluates the transmission properties of the radio channels using the received signals from the base stations in order to therefore predistort accordingly the radio signals to be transmitted, so that the orthogonality of the codes is assured in the receiving mobile stations. For this purpose, the mobile station transmits training symbols to the base station, which compares the received training symbols with stored training symbols in order to determine the transmission properties of the radio channel. Thus channel reciprocity is assumed. In this context, it is advantageously not necessary to transmit any training symbols from the base station to the mobile station, thus saving on the transmission bandwidth. A predistortion of this type is therefore based on the assumption that the channels for the radio signals to be transmitted behave like those for the radio signals that have just been received. This principle is also designated as reciprocity. However, since the carriers of the mobile stations are in motion, the principle of reciprocity is not correct, because the radio channel and thus the transmission properties of this radio channel change. Through a correction of the phase of the received radio signals, a correction of the mistaken assumption of reciprocity is possible.

In FIG. 1, a method according to the present invention for receiving radio signals that have been code-spread is depicted. In method step 1, the method is started, and in method step 2, code-spread radio signals are received, amplified, filtered, and mixed and digitalized in an intermediate frequency. In method step 3, the received radio signals are subjected to a code despreading. This code despreading is carried out using a correlator. Therefore, only signals that are meant for the mobile station are despread, since the radio signals, as described above, are predistorted using joint-predistortion.

For the code-despread signals, in method step 4, a phase is determined for each symbol, and thus the radio signals are demodulated. Since the radio signals have symbols, for each symbol, i.e., at every symbol duration, a phase value is determined. It is a question here of a coherent demodulation. The phases of the symbols in the radio signals are determined, in that the received signals are multiplied using a carrier signal. The phase per symbol results from this. The carrier signal represents, for example, the zero angle, and, as a result of the multiplication, differential terms arise between the phase of the received signal and the phase of the carrier signal, the phase of the received signal resulting therefrom. The carrier signal, as is well known, is tracked using a closed loop.

In method step 5, the ascertained phases are mapped using a preselected mapping specification in a preselected phase segment. A phase error is determined for all phases. In this context, the absolute position of the individual phases is not important, only the deviation. Therefore, all phases are mapped onto a given value and the deviation from this value then yields the phase error, which is used as a correction for the radio signals.

Here, a quadrature phase modulation (QPSK=quadrature phase shift keying) is used. In a quadrature phase modulation, in the so-called phase crossing, four phases are available for the modulation, in other words, for example, 45°, 135°, 225°, 315°. The phase crossing establishes a complex plane, in which a signal is recorded with respect to its amplitude and its phase. On the abscissa, the real portion is removed, whereas on the ordinate, the imaginary portion is removed. In this context, the amplitude is not modulated. In one refinement of the invention, however, it is possible to modulate the amplitudes as well.

If amplitudes and phases are modulated, quadrature amplitude modulation results. In the quadrature phase shift keying, which is used here, the individual phases in the first quadrants of the phase crossing are mapped. In QPSK, the abscissa and the ordinate of the phase crossing are used as decision thresholds, so that four decision thresholds result. The first quadrant is accordingly here the prescribed phase zone.

The demodulated base band signal in the receiver at time $K*T$, T being the symbol duration and K being a whole number, is described as $y_k = d_k \cdot e^{j\Delta\phi} + n_k$, $d_k$ being a complex symbol, which describes the varying modulation states. They are the demodulated phases. $n_k$ indicates the cumulative white noise and $\Delta\phi$ describes the phase error. If a general representation for this is used in polar coordinates, then in general $y_k = |d_k \cdot e^{j\Delta\phi} + n_k| \cdot e^{j \cdot arg(d_k \cdot e^{j\Delta\phi} + n_k)} = |y_k| \cdot e^{j\Phi_y}$ follows, $\phi_y$ indicating the total phase and $y_k$ the amount.

As mapping specification, in the case of QPSK, the complex signal space is divided into four sectors:

S1: $0 \leq \phi_y < \Pi/2$
S2: $\Pi/2 \leq \phi_y < \Pi$
S3: $\Pi \leq \phi_y < 3\Pi/2$
S4: $3\Pi/2 \leq \phi_y < 2\Pi$ All scanning values are mapped in sector S1, i.e., the first quadrant, specifically using the following algorithm: for angles located in sector S1, the angle remains unchanged. For angles located in sector S2, the angle is changed by $-\pi/2$, so that the angles are located then in sector S2. For angles located in sector S3, the angle is rotated about $-\pi$, so that the angles then are located in sector S1. For angles located in sector S4, the angle is rotated about $-3\pi/2$, so that these angles are then located in sector S4.

In method step 6, an average value of the phase deviation over a plurality of symbols is calculated. The equation $$\hat{y} = \frac{1}{n} \cdot \sum_{k=1}^{n} y_k$$

yields a linear average over n symbols y.

The number of symbols that are used for the average is prescribed. A larger number aids in correcting phase errors, which are derived from analog components in the transmitter and in the receiver. In this context, short-term phase errors due to a changed radio channel are averaged, for example due to a passing motor vehicle. Therefore, a smaller number of symbols is best suited for the average in order to eliminate the phase errors using the aforementioned effects.

After scaling and conjugation, in method step 7, phase correction factor p is therefore calculated in the following manner:

$$p = \frac{\hat{y}^*}{|\hat{y}|} \approx e^{-\Delta\varphi}.$$

In method step 8, the despread radio signal from method step 4 is multiplied by the phase correction factor, so that the radio signal is therefore corrected by the average phase error.

In method step 9, data detection is carried out, by the phases of the symbols being compared with decision thresholds, and in method step 10, the detected data are available.

Figure 2:
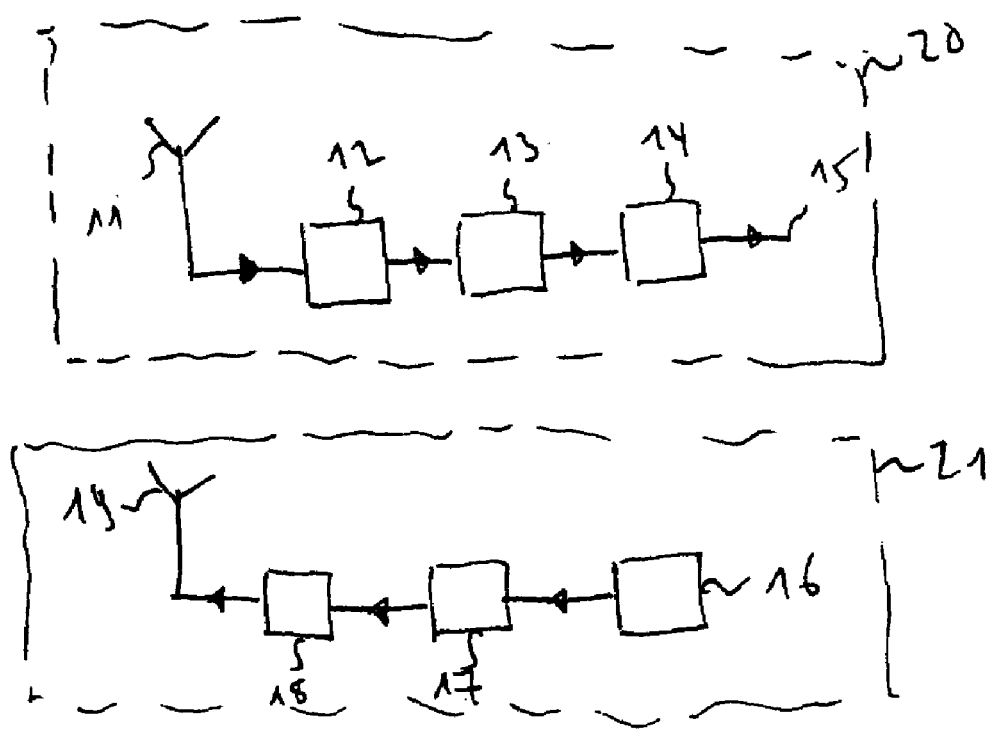
FIG. 2 depicts a mobile station according to the present invention for transmitting and receiving radio signals.

In FIG. 2, a mobile station according to the present invention is depicted having a receiving part 20 and a transmitting part 21. The receiving part 20 includes an antenna 11, a high-frequency receiving device 12, a receiver 13, a data detector 14, and an output for the detected data 15. The transmitting part 21 includes a data source 16, a modulator 17, a high-frequency transmitting device 18, and an antenna 19.

Using antenna 11, radio signals are received so as to be amplified in high-frequency receiving device 12, filtered, and converted into an intermediate frequency. In addition, the signals are digitalized. In receiver 13, the signals are despread and the above-mentioned phase correction is undertaken. This receiver 13 is implemented on a signal processor. The corrected signals are detected in a data detector 14, which can be implemented on the same processor, but can also be available on a separate processor. At output 15, the detected data are available as a data stream.

The data to be transmitted are generated in a data source 16, which provides for a microphone having an attached electronics for converting acoustical signals into electrical signals for amplifying and digitalizing the signals. In addition to a microphone, a computer or a camera can also be a data source. In a modulator 17, the signals coming from data source 16 produce modulation signals that are modulated using the above-mentioned quadrature phase shift keying. In addition, in modulator 17, the signals to be transmitted are code-spread. In modulator 17, the training signals are added to the useful signals as well. Modulator 17 is implemented on a processor. In a high-frequency transmitting device 18, the signals to be transmitted are converted into the transmitting frequency, amplified, and then transmitted using antenna 19.

What is claimed is:

1. A method for receiving in a mobile station radio signals transmitted from a base station to at least one mobile station, the method comprising:

code-despreading the radio signals transmitted from the base station, wherein the radio signals transmitted from the base station have symbols and are code-spread using one code for each mobile station, and are predistorted in accordance with the expected transmission properties regarding each mobile station, and are modulated with regard to their phases;

determining the phases of the radio signals for each of the symbols to phase demodulate the radio signals;

mapping the determined phases onto a phase zone in accordance with a preestablished rule;

forming an average value from a preestablished number of the determined phases;

determining a phase correction factor from the average value; and multiplying the phase correction factor by the demodulated radio signals in order to correct a phase error before the radio signals are detected;

wherein the phase correction factor is determined using scaling and conjugation of the average value.

2. The method of claim 1, wherein the radio signals are modulated with respect to their phases and amplitudes.

3. A mobile station for transmitting and receiving radio signals, the mobile station comprising:

a receiver adapted to:
      receive code-spread radio signals and transmit code-spread radio signals together with training signals, wherein the radio signals have symbols and have been predistorted in accordance with the expected transmission properties of the radio channels;
      code-despread radio signals transmitted to the mobile station;
      determine the phases of the radio signals for each of the symbols to phase demodulate the radio signals;
      map the determined phases onto a phase zone in accordance with a preestablished rule;
   form an average value from the mapped phases;
      calculate a phase correction factor from the average value; and
      multiply the phase correction factor by the code-despread radio signals in order to correct a phase error before a data detector detects the radio signals;
      wherein the receiver calculates the phase correction factor by scaling and conjugating the average value.

4. The mobile station of claim 3, wherein the mobile station modulates the radio signals with respect to their phases and their amplitudes.

* * * * *